No. 852,996. PATENTED MAY 7, 1907.
C. BOHRSSEN.
PLOW.
APPLICATION FILED MAY 26, 1906.

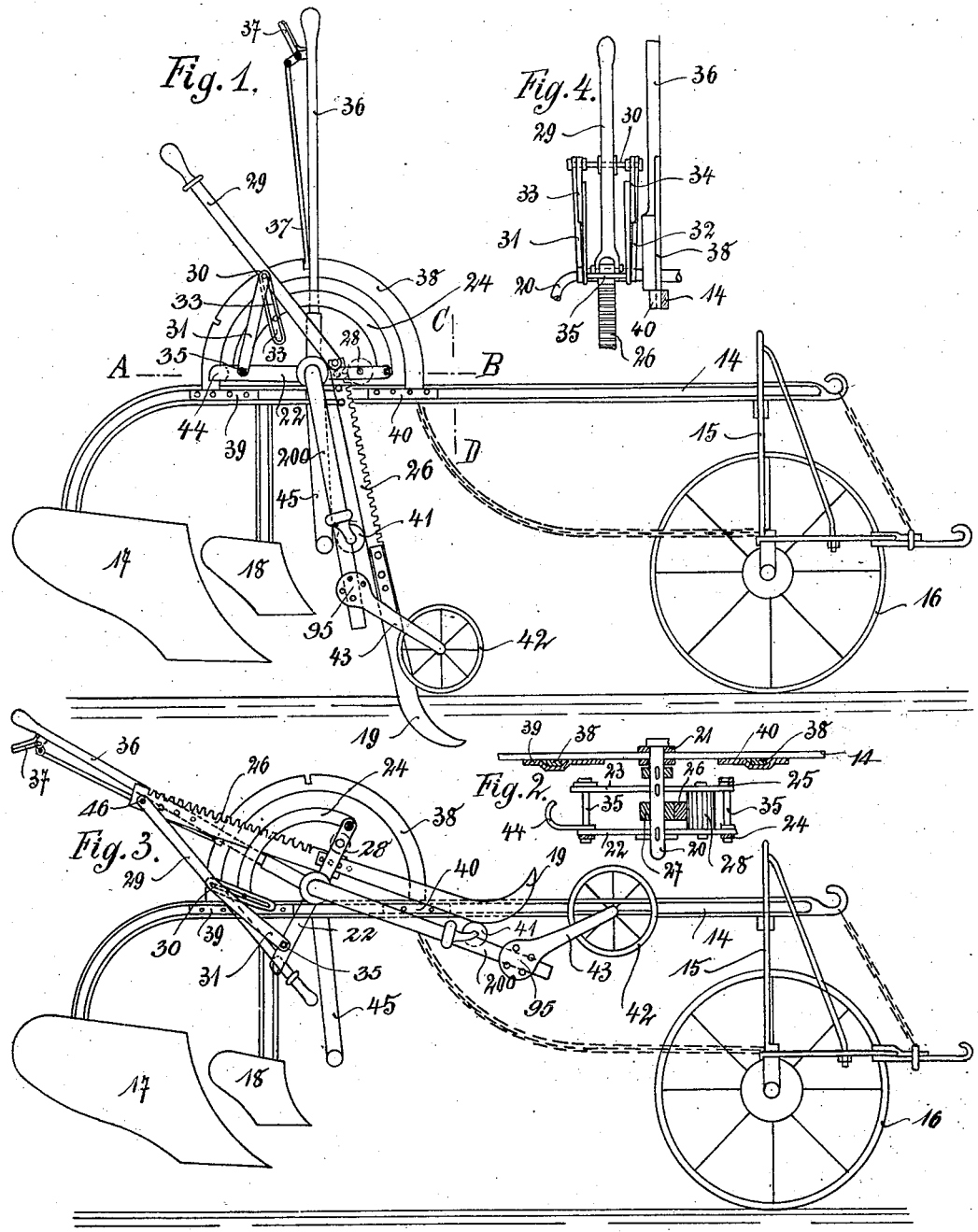

5 SHEETS—SHEET 2.

No. 852,996. PATENTED MAY 7, 1907.
C. BOHRSSEN.
PLOW.
APPLICATION FILED MAY 26, 1906.

5 SHEETS—SHEET 3.

No. 852,996. PATENTED MAY 7, 1907.
C. BOHRSSEN.
PLOW.
APPLICATION FILED MAY 26, 1906.

5 SHEETS—SHEET 4.

Witnesses:
William Schulz
Ernest Pfennigwerth

Inventor:
Conrad Bohrssen
by his attorney

No. 852,996.
PATENTED MAY 7, 1907.
C. BOHRSSEN.
PLOW.
APPLICATION FILED MAY 26, 1906.
5 SHEETS—SHEET 5.
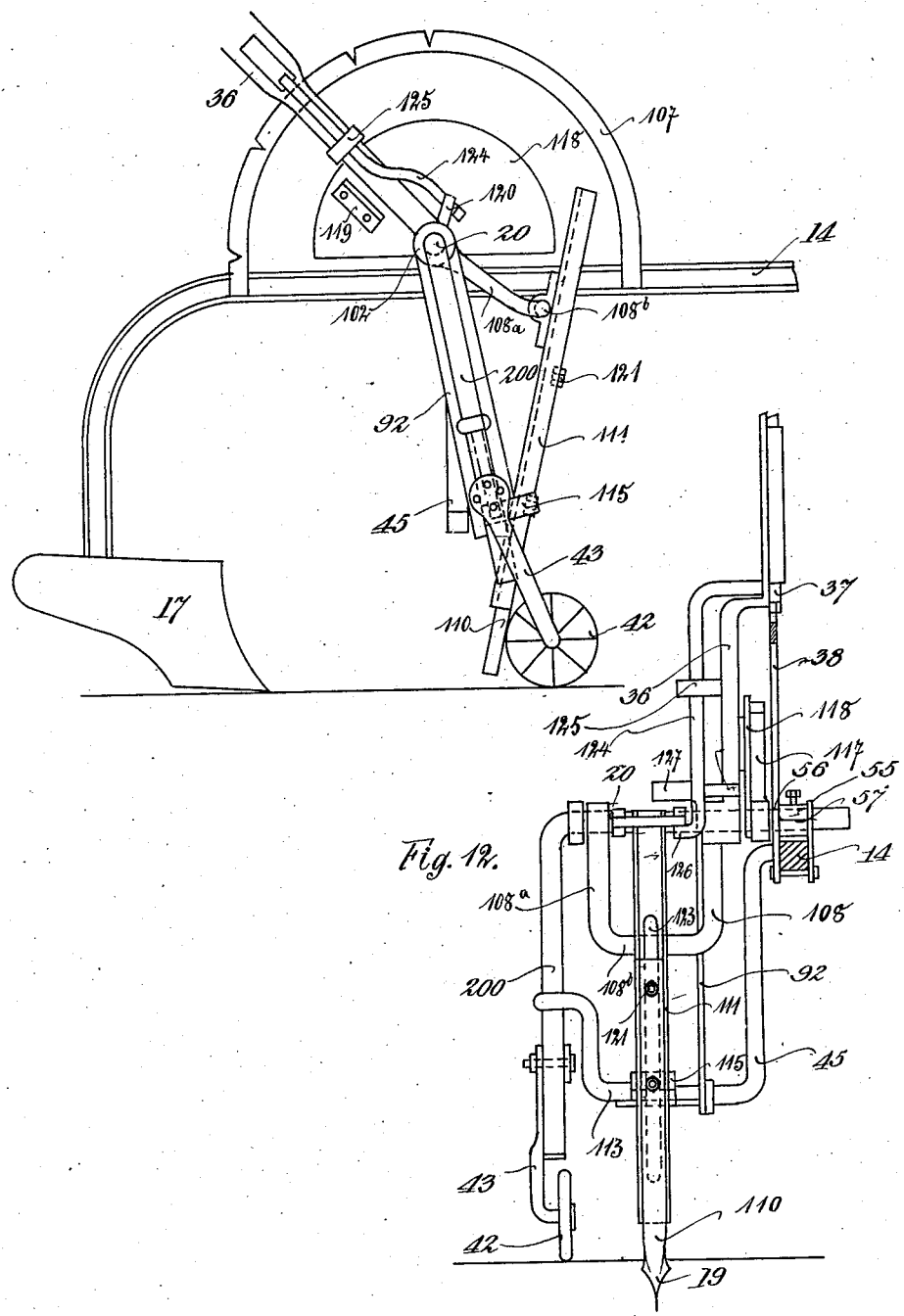

UNITED STATES PATENT OFFICE.

CONRAD BOHRSSEN, OF GROSS MUNZEL, NEAR WUNSTORF, GERMANY.

PLOW.

No. 852,996.

Specification of Letters Patent.

Patented May 7, 1907.

Application filed May 26, 1906. Serial No. 318,800.

*To all whom it may concern:*

Be it known that I, CONRAD BOHRSSEN, a citizen of Germany, residing at Gross Munzel, near Wunstorf, Hanover, Germany, have invented new and useful Improvements in Plows, of which the following is a specification.

This invention relates to a subsoil plow which is so constructed that its subsoil share may be made to readily clear the ground. For this purpose means are provided for first raising the share out of the ground, and for then tilting it. By these means, the share may also be readily adjusted to different depths of furrows while the plow is in operation.

Figure 5:
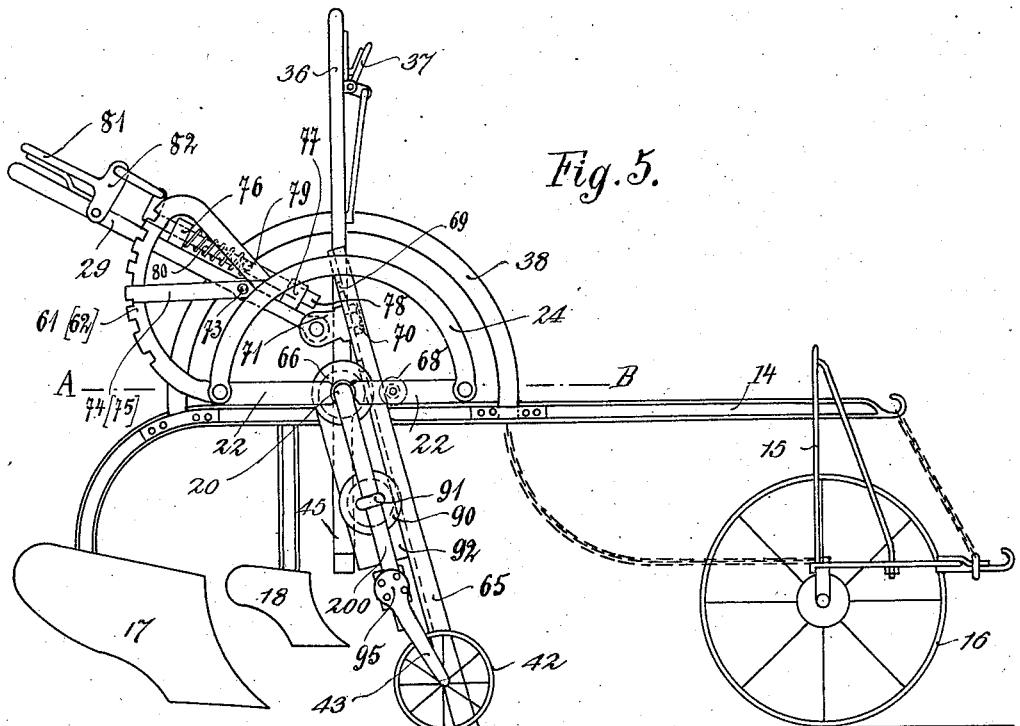
Figure 6:
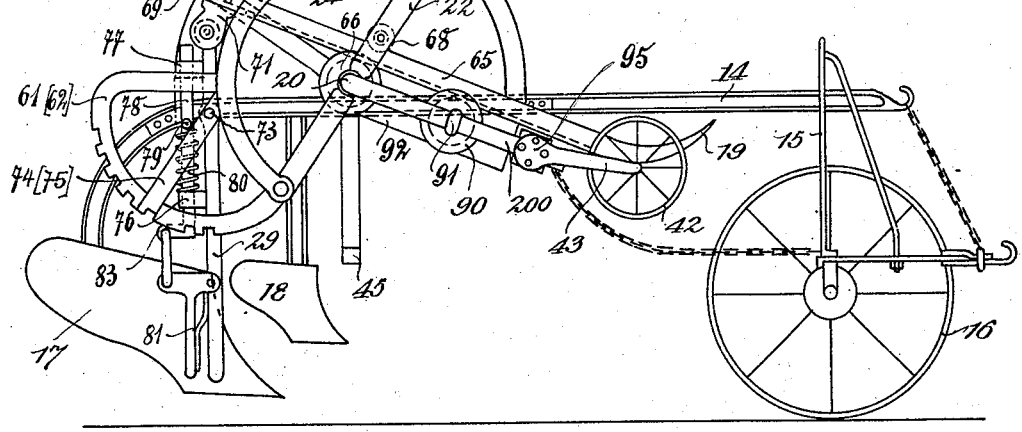
Figure 7:
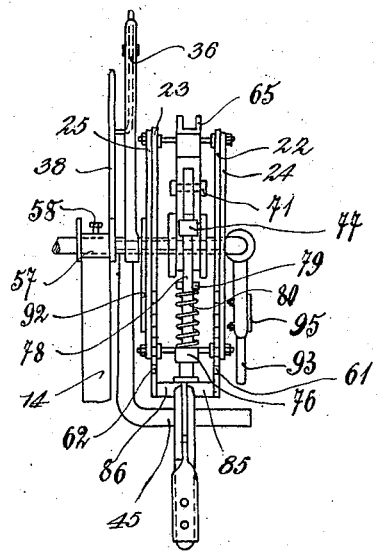
Figure 8:
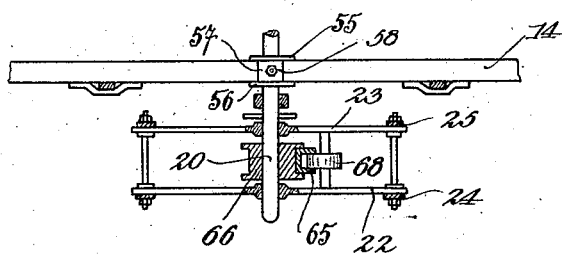
Figure 9:
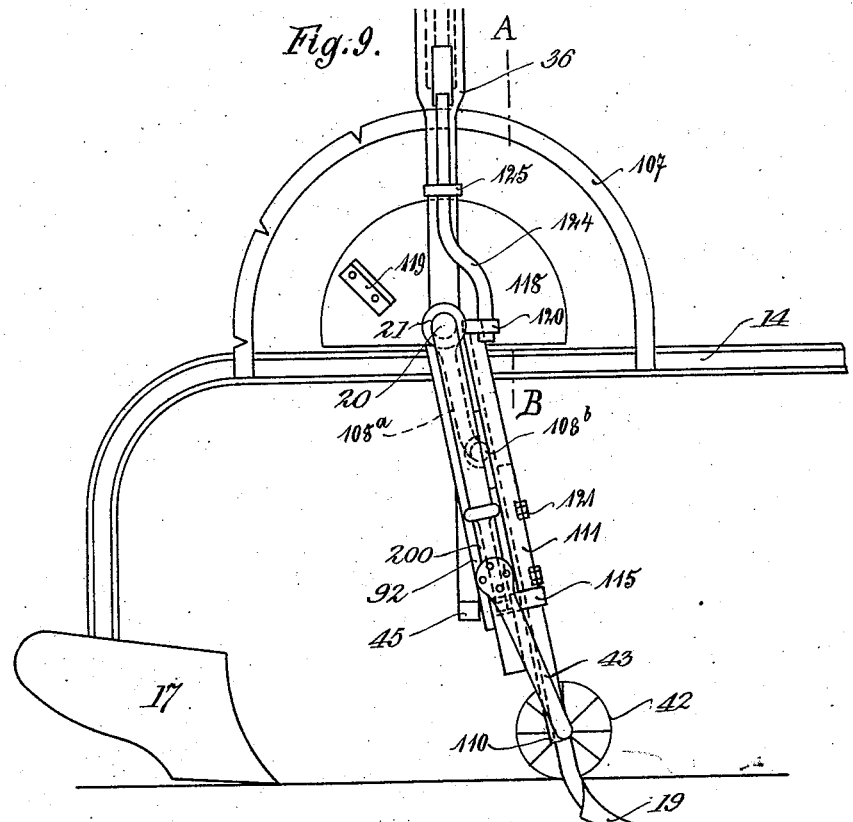
Figure 10:
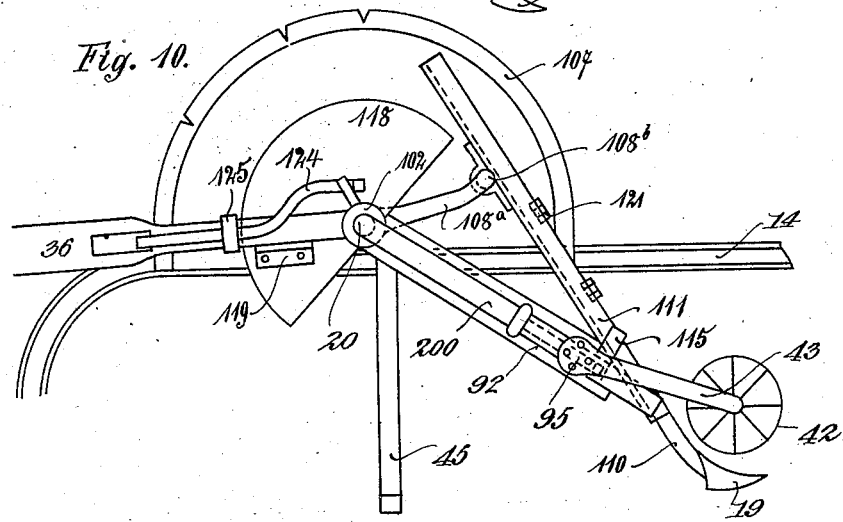

In the accompanying drawings: Figure 1 is a side elevation of the plow, showing the subsoil share lowered; Fig. 2 a section on line A—B, Fig. 1; Fig. 3 a side elevation similar to Fig. 1, showing the subsoil share raised; Fig. 4 a section on line C—D, Fig. 1; Figs. 5 and 6 are side elevations of a modification of the plow, showing the parts in different positions; Fig. 7 is an end elevation of Fig. 6; Fig. 8 a section on line A—B, Fig. 5; Figs. 9—11 are side elevations of a further modification of the plow, showing the parts in different positions, and Fig. 12 is a section on line A—B, Fig. 9.

The longitudinal plow beam 14 rests on a support 15 provided with wheels 16 and carries at its rear end the plow share 17 and the intermediate share 18. The main support of the adjusting device for the subsoil share 19, consists of a spindle 20 having a downwardly bent arm 200 and supported in a bearing 21 secured to the plow beam 14. To the spindle 20 are secured two transverse arms 22, 23 which support the quadrants 24, 25. Between arms 22, 23 there is mounted a rack 26 carrying the subsoil share 19 and supported at one side by a roller 27 mounted on arm 200. At the opposite side, rack 26 engages a toothed wheel 28 arranged between arms 22, 23. For small plows, a roller can be used in place of the toothed wheel, and the front portion of bar 26 may be made smooth, as in such cases there is not the same danger of the subsoil share "kicking" as in large plows.

To the upper end of supporting bar 26 of the subsoil share 19, is pivoted a hand-lever 29 connected to supporting levers 31, 32, as well as to slotted links 33, 34, by means of a bolt 30. Levers 31, 32 are pivoted on one of the bolts 35, (Fig. 2), which connect the ends of arms 22, 23, while the links 33, 34 are secured to quadrants 24, 25 by means of bolts engaging corresponding holes of the latter. A second hand-lever 36 is rigidly secured to spindle 20, and may be set at different inclinations by means of a pawl 37 engaging recesses of a quadrant 38 which is secured to beam 14 by means of straps 39, 40. The upper part of the subsoil share 19 rests against a roller 41 secured to arm 200. At the bottom end of the latter, there is provided a wheel 42, the bracket 43 of which is adjustably mounted on arm 200 by means of a suitable clamping device 95.

A spring pawl 44 holds the lever 29 in the lowered position, (Figs. 1 and 2). The supporting bar 26 of the subsoil share is provided at its upper end with a series of holes, so that the supporting bar may be adjusted to different levels by means of a bolt 46. In this way the subsoil share can be adjusted to any desired height. By altering the point at which the quadrant 24 and the slotted lever 33 are screwed together, the position of bolt 30 on which lever 29 is pivoted, may be changed. Arm 200, in the lowered position, rests against a bent support 45 secured to plow beam 14, (Fig. 1). After bolt 46 has been removed, the subsoil share can be raised or lowered by means of hand-lever 29, while by means of lever 36, the entire device, comprising the subsoil share and front wheel may be lifted, as shown in Fig. 3.

In the modification shown in Figs. 5–8, the plow beam 14 is supported by a bracket 15 on the axle of the wheels 16, and carries at its rear end, the plow share 17 and the intermediate share 18. The main support of the adjusting device for the subsoil share 19 consists of a spindle 20 which is provided with a downwardly bent arm 200 and is supported in a bearing composed of plates 55, 56 which are secured to the plow beam 14. The construction of the bearing is such that between plates 55 and 56, the spindle 20 is embraced by a sleeve 57, to which the spindle 52 may be secured by set screw 58 (Fig. 7). In this way the distance of the arm 200 from the frame 14 may be readily adjusted. To spindle 20 are keyed two arms 22, 23, to which are secured quadrants 24, 25, the ends of which are supported by semi-circular frames 38, 39. Between arms 22, 23, is arranged a bar or rail 65, U-shaped in cross section and carrying the subsoil share 19. Bar 65 rests at one side against a roller 66 mounted on spindle 20, while it rests on the other side against a roller 68 supported by arms 22, 23. The upper end of bar 65 is provided with a series of holes 69 adapted to receive the threaded stem of an eye 71, which may be secured to bar 65 by a nut 70. The hand-lever 29 turns on a spindle 73 supported in cross arms 74, 75. Upon lever 29 is mounted in guides 76, 77, a T-shaped latch 78 influenced by a spring 80, interposed between guide 76 and pin 79 of latch 78. Latch 78 is connected to a spring pawl 81 mounted on lever 29, by means of an intermediate part 84 connecting lugs 82 and 83. Arms 85, 86, (Fig. 7), of the T-shaped latch 78, engage corresponding notches of the quadrants 61, 62, so that the depth to which the share may be lowered, is readily adjustable while the plow is in operation. The second hand-lever 36 is rigidly secured to the spindle 20 and may be adjusted by means of a pawl and spring 37 engaging quadrant 38 secured to plow beam 14. The bar 65 rests with its lower end upon a roller 90, the spindle 91 of which is secured at one side to arm 200, and at the other side to a flat iron bar 92 rigidly connected to spindle 20. The lower end of arm 200 is provided with a supporting wheel 42, the bracket 43 of which is adjustably secured to arm 200 by a clamp and bolt device 95. A bent rod 45 secured to the frame 14, serves as a support for the flat bar 92 and for all the parts secured to spindle 20. The subsoil share 19 may be set while in operation, for different depths of furrows, by means of hand-lever 29, while, by means of lever 36, the whole device may be raised together with the subsoil share and the supporting wheel 43, as shown in Fig. 6.

The beam of the plow shown in Figs. 9—12, carries in bearings 55, 56, the spindle 20 provided with an arm 200. On spindle 20 is loosely mounted an adjustable hand-lever 36, the pawl 37 of which is adapted to enter one of the slots of the quadrant 38. Lever 36 is extended beyond spindle 20 to form a U-shaped frame 108, the arm 108ª of which is pivoted to spindle 20. To the transverse arm 108ᵇ is fulcrumed a U-shaped rail 111 receiving the shank 110 of the subsoil share 19. For supporting the part 111 and the subsoil share 19, a bent rod 113 is used, which is connected to crank arm 200 and to a flat bar 72 which is rigidly connected to spindle 20. To rod 113 is secured a fork 115 supporting rail 111. A bent arm 45 rigidly secured to plow beam 14 is used for supporting the parts during operation. Wheel 42 is adjustably secured by means of its bracket 43 to arm 200. To the spindle 20 is further rigidly secured an arm 117, (Fig. 12), to which is attached a semi-circular plate 118. The latter is provided with a stop 119 for hand-lever 36. The shank 110 of the subsoil share, is connected to the U-shaped rail 111, by means of bolts 121 passing through a slot 123 of the rail, so that the depth of the subsoil share may be readily adjusted. To pawl 37 is connected a bent arm 124 which passes through a slot of lever 36. At its lower end arm 124 is provided with a projection 126 engaging the lower side of bracket 120. A stop 127 on lever 36 limits the movement of bracket 120.

In the position of the parts shown in Fig. 9, hand-lever 36 is so set that the parts supporting the subsoil share, rest against the horizontal section of arm 124. The subsoil share is maintained in position by means of bracket 120 which forms an abutment for the same. If the pawl of hand-lever 36 is raised for the purpose of adjusting the position of the lever, bracket 120 will be raised by means of the projection 126 of arm 124, and the supporting rod of the subsoil share will be released. If hand-lever 36 is then turned back into the position shown in Fig. 10, the subsoil share will be first raised vertically, to an extent corresponding to the height to which the cross arm 108ᵇ has been raised. If the hand-lever 36 is turned still further back, it bears against stop 119, so that it takes with it plate 118 and spindle 20. All the parts supporting the subsoil share are therefore swung upward and into their final position, as shown in Fig. 10.

It will be understood that the details of construction may be varied without departing from the spirit of my invention.

I claim:

1. In a plow, a beam and a share secured thereto, combined with a bent arm pivoted to the beam, a subsoil share engaging the arm, means for raising the subsoil share along the arm, and means for tilting the arm, substantially as specified.

2. In a plow, a beam and a share secured thereto, combined with a bent arm pivoted to the beam, a wheel adjustably secured to the arm, a subsoil share supported by the arm, means operatively connected to the subsoil share for raising and lowering the same, and means operatively connected to the arm for tilting the arm and the subsoil share, substantially as specified.

3. In a plow, a beam and a share secured thereto, combined with a bent arm pivoted to the beam, a wheel adjustably secured to the arm, a rail engaging the arm, a subsoil share carried by the rail, a first hand lever operatively connected to the rail for reciprocating the same along the arm, and a second hand lever operatively connected to the arm for tilting the arm and the rail supported by the arm, substantially as specified.

4. A plow provided with a longitudinal beam, a rotatable transverse spindle having a downwardly bent arm, a U-shaped rail engaging said arm, a subsoil share secured to the rail, means for raising the rail, and means for tilting the arm, substantially as specified.

Signed by me at Hanover, Germany, this 12th day of May, 1906.

CONRAD BOHRSSEN.

Witnesses:
 LEONORE RASCH,
 ANNA DIPPEL.